(12) United States Patent
Newton et al.

(10) Patent No.: US 7,810,126 B2
(45) Date of Patent: Oct. 5, 2010

(54) INTER-APPLICATION CONTROL TO IMPROVE THE PERFORMANCE OF PLAYBACK OF STORED INTERACTIVE-TV APPLICATIONS

(75) Inventors: Philip Steven Newton, Eindhoven (NL); Wilhelmus Jacobus Van Gestel, Eindhoven (NL); Declan Patrick Kelly, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1466 days.

(21) Appl. No.: 10/543,397

(22) PCT Filed: Dec. 16, 2003

(86) PCT No.: PCT/IB03/06359

§ 371 (c)(1),
(2), (4) Date: Jul. 26, 2005

(87) PCT Pub. No.: WO2004/068847

PCT Pub. Date: Aug. 12, 2004

(65) Prior Publication Data

US 2006/0080699 A1    Apr. 13, 2006

(30) Foreign Application Priority Data

Jan. 31, 2003   (EP)   ................... 03100203

(51) Int. Cl.
*H04N 7/173*   (2006.01)

(52) U.S. Cl. .................. 725/115; 725/134; 386/95; 386/124

(58) Field of Classification Search ............. 725/46, 725/83, 95, 134, 105, 109–112, 114, 115; 707/3; 348/564; 709/217; 386/46, 95, 124
See application file for complete search history.

(56) References Cited

U.S. PATENT DOCUMENTS

| 5,847,771 | A | * | 12/1998 | Cloutier et al. ............. 348/564 |
| 6,067,400 | A | * | 5/2000 | Saeki et al. .................... 386/95 |
| 6,230,192 | B1 | * | 5/2001 | Roberts et al. .............. 709/217 |
| 6,970,641 | B1 | * | 11/2005 | Pierre et al. .................... 386/83 |
| 7,171,402 | B1 | * | 1/2007 | Chatani ........................ 707/3 |
| 2002/0162115 | A1 | * | 10/2002 | Bruckner et al. ............ 725/105 |
| 2004/0049598 | A1 | * | 3/2004 | Tucker et al. ................ 709/246 |

FOREIGN PATENT DOCUMENTS

| WO | WO0000981 A2 | 1/2000 |
| WO | WO0133847 A1 | 5/2001 |

* cited by examiner

*Primary Examiner*—Thai Tran
*Assistant Examiner*—Mishawn Dunn

(57) ABSTRACT

A method and apparatus for improving the performance of the running of a stored interactive application on a de-coding apparatus is disclosed. The recorded program which is associated with the stored interactive application is run, wherein the program and interactive application are stored in a storage device. The running of the stored interactive application is controlled using a second application.

14 Claims, 6 Drawing Sheets

INTER-APPLICATION CONTROL TO IMPROVE THE PERFORMANCE OF PLAYBACK OF STORED INTERACTIVE-TV APPLICATIONS

The invention relates to interactive television applications, and more particularly to a method and apparatus for improving the performance of playback of stored interactive television applications.

Interactive-TV applications, as defined in MHP, OpenTV, MHEG, etc., are broadcast together with a program (an audio stream, a video stream, an audio/video stream, etc.). When the viewer wishes to record such a program, the viewer might also want to store or record the interactive application associated with the program. A viewer expects a program to appear the same when it is recorded as when the program comes in from a live broadcast. So if a program has an application tied to it, then this application must also be available when the viewer wants to play back the stored program. As a result, the interactive application must be stored as well.

For a viewer to be able to view and receive interactive television, the viewer must use a digital set-top box. Advanced versions of a set-top box have storage capabilities, which allow the viewer to record their favorite programs. Besides the obvious benefit of being able to view a program at any desired time, a recorded program also has other benefits over a live program. Trick play operations, for instance, is only possible when a program is at least partially recorded. So recording a program gives the user more control and adds more features to the program.

The same is also true when the interactive TV application associated with the recorded program is stored. When the program is recorded and the application is stored, random access of the program and of the application become possible. This means that new yet unexplored features become viable as the application designer and the viewer are no longer tied to the linear time based viewing of a broadcast.

When a program is recorded and the corresponding application is stored, it becomes possible to send the program and the interactive program across a network to another set-top box or storage device. This allows playback of the program over a digital interface. Decoding content on a set-top box that does not know that the content is stored can cause problems. Stored content can be accessed in a non-linear manner. If the set-top box does not support the non-linear manner, then the playback of the content will not be consistent. Also, in the case of playback across a digital interface, the set-top box may not support communication with a storage device. Thus, there is a need for a method and apparatus which allows for non-linear playback of recorded programs and associated interactive applications even when the set-top box does not support such operations.

It is an object of the invention to overcome the above-described deficiencies by providing a method and apparatus for improving the performance of playback of the stored interactive-TV applications. According to one embodiment of the invention, a second application is used to control and improve the performance of the stored interactive-TV application.

According to one embodiment of the invention, a method and apparatus for improving the performance of running of a stored interactive application on a decoding apparatus is disclosed. The recorded program which is associated with the stored interactive application is run, wherein the program and interactive application are stored in a storage device. The running of the stored interactive application is controlled using a second application.

These and other aspects of the invention will be apparent from and elucidated with reference to the embodiments described hereafter.

The invention will now be described, by way of example, with reference to the accompanying drawings, wherein.

Figure 1:
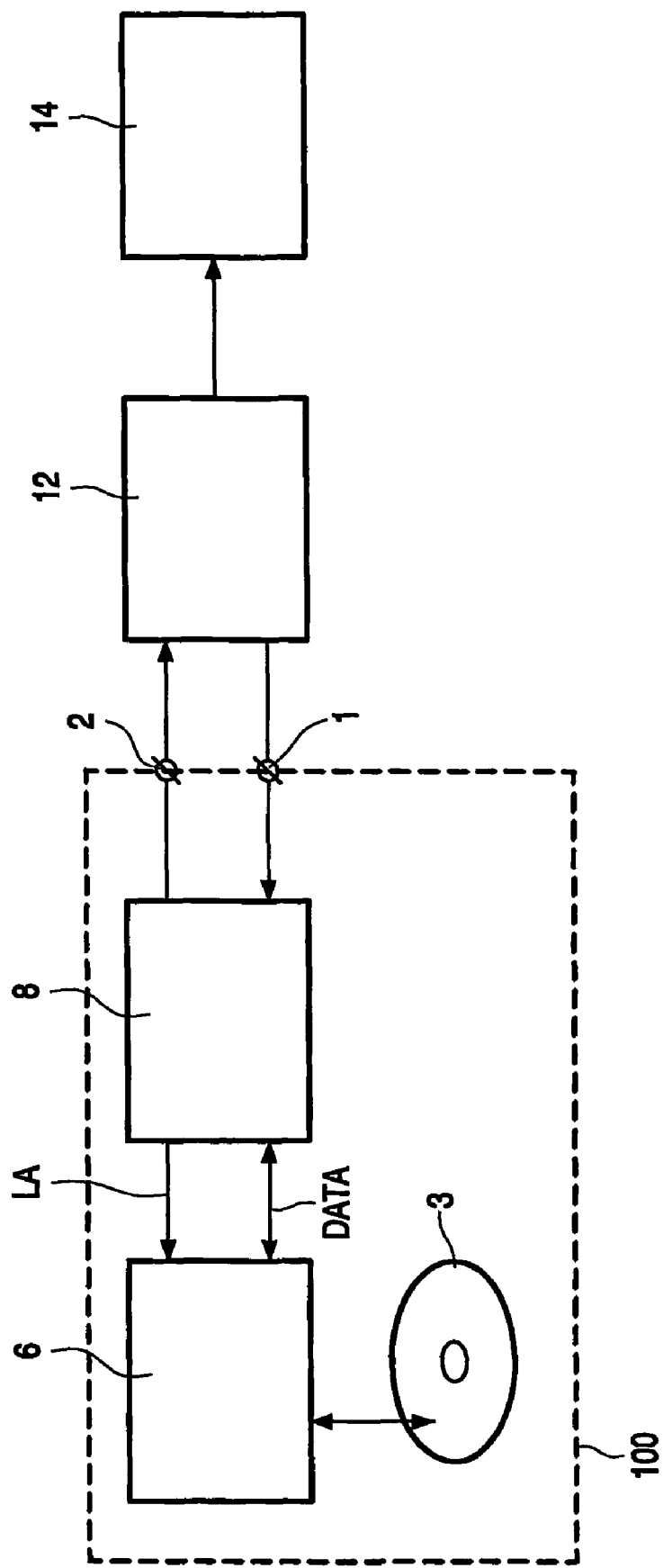
FIG. 1 illustrates a block diagram of a audio-video apparatus suitable to host embodiments of the invention.

FIG. 1 illustrates an audio-video apparatus 100 suitable to host the invention. The apparatus comprises an input terminal 1 for receiving a digital video signal to be recorded on a disc 3. Further, the apparatus comprises an output terminal 2 for supplying a digital video signal reproduced from the disc. These terminals may in use be connected via a digital interface to a digital television receiver and decoder in the form of a set-top box (STB) 12, which also receives broadcast signals from satellite, cable or the like, in MPEG TS format. The set-top box 12 provides display signals to a display device 14, which may be a conventional television set.

The video recording apparatus 100 as shown in FIG. 1 is composed of two major system parts, namely the disc subsystem 6 and the video recorder subsystem 8, controlling both recording and playback. The two subsystems have a number of features, as will be readily understood, including that the disc subsystem can be addressed transparently in terms of logical addresses (LA) and can guarantee a maximum sustainable bit-rate for reading and/or writing data from/to the disc.

Suitable hardware arrangements for implementing such an apparatus are known to one skilled in the art, with one example illustrated in patent application WO-A-00/00981. The apparatus generally comprises signal processing units, a read/write unit including a read/write head configured for reading from/writing to disc 3. Actuators position the head in a radial direction across the disc 3, while a motor (not shown) rotates the disc 3. A microprocessor (not shown) is present for controlling all the circuits in a known manner.

Figure 2:
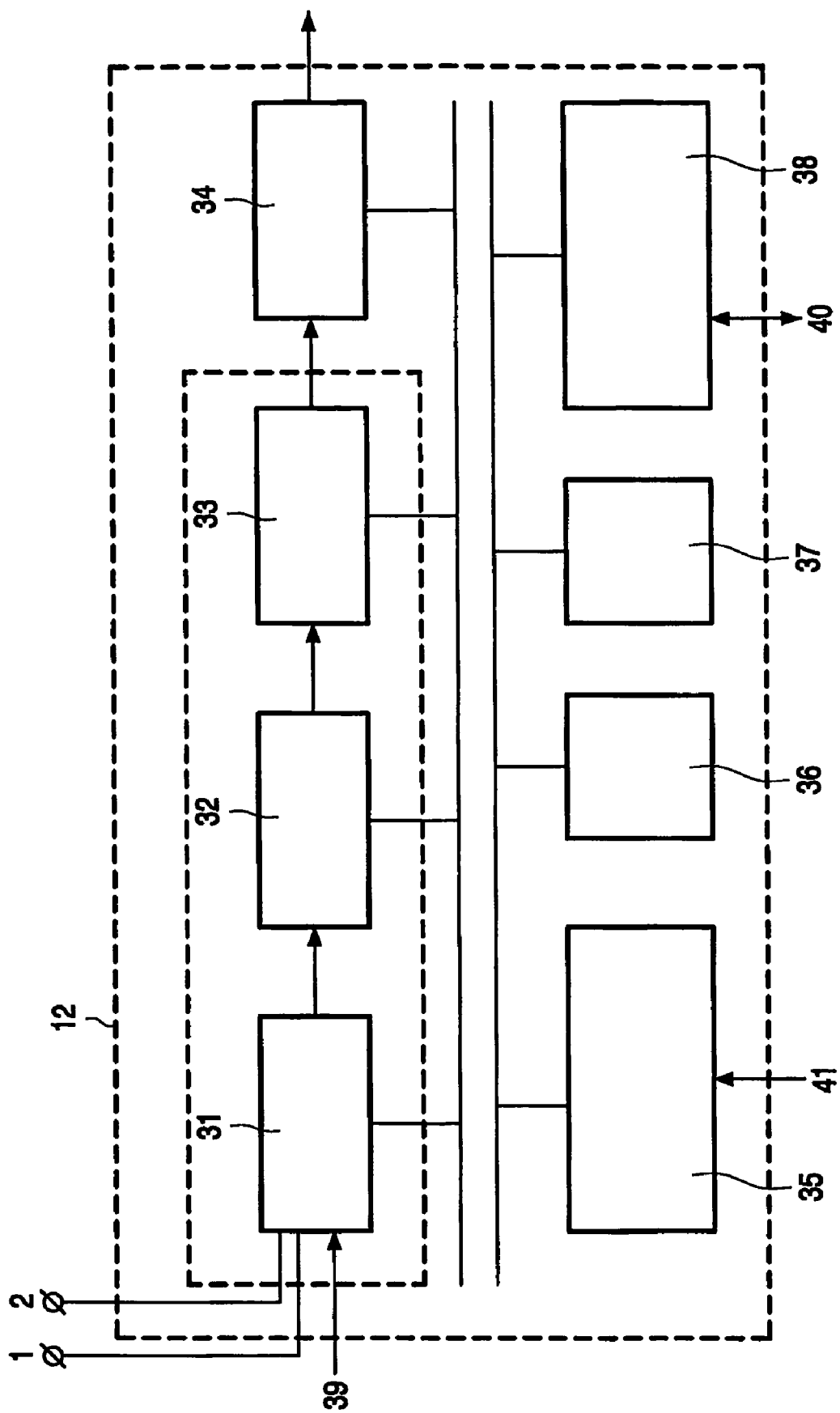
FIG. 2 illustrates a block diagram of a set-top box which can be used to implement at least one embodiment of the invention.

Referring to FIG. 2, a block diagram of the set-top box 12 is shown. It will be understood by those skilled in the art that the invention is not limited to a set top box but also extends to a variety of devices such as a DVD player, PVR box, a box containing a Hard disk (recorder module), etc. A broadcast signal 39 is received and fed into a tuner 31. The tuner 31 selects the channel on which the broadcast audio-video-interactive signal is transmitted and passes the signal to a processing unit 32. The processing unit 32 demultiplexes the packets from the broadcast signal if necessary and reconstructs the television programs and/or interactive applications embodied in the signal. The programs and applications are then decompressed by a decompression unit 33. The audio and video information associated with the television programs embodied in the signal is then conveyed to a display unit 34, which may perform further processing and conversion of the information into a suitable television format, such as NTSC or HDTV audio/video. Applications reconstructed from the broadcast signal are routed to random access memory (RAM) 37 and are executed by a control system 35.

The control system 35 may include a microprocessor, micro-controller, digital signal processor (DSP), or some other type of software instruction processing device, and may receive user input information 41. The RAM 37 may include memory units which are static (e.g. SRAM), dynamic (e.g. DRAM), volatile or non-volatile (e.g., FLASH), as required to support the functions of the set-top box. When power is applied to the set-top box, the control system 35 executes operating system code which is stored in ROM 36. The operating system code executes continuously while the set-top box is powered in the same manner as the operating system code of a typical personal computer and enables the set-top box to act on control information and execute interactive and other applications. The set-top box also includes a modem 38. The modem 38 provides both a return path by which viewer data can be transmitted to the broadcast station and an alternate path 40 by which the broadcast station can transmit data to the set-top box.

Although the term "set-top box" is used herein, it will be understood that this term refers to any receiver or processing unit for receiving and processing a transmitted signal and conveying the processed signal to a television or other monitor. The set-top box may be in a housing which physically sits on top of a television, it may be in some other location from the television, or it may be incorporated into the television itself.

As mentioned above, users want to be able to access recorded programs and interactive applications in a non-linear manner. According to one embodiment of the invention, a second application, e.g., a control application, is used to improve the performance of the stored interactive application during playback. Not all set-top boxes will have the necessary capabilities to run some interactive applications. The control application provides the actual capabilities to run the stored interactive applications.

The control application can be an interoperable plug-in application as defined in MHP(multimedia home platform). The MHP specification extends the existing DVB standards for broadcast and interactive services in all transmission networks including satellite, cable, terrestrial and microwave systems. The MHP specification provides a consistent set of features and functions required for the enhanced broadcasting and interactive broadcasting profiles. MHP provides API's (application programmer interfaces) for allowing one application to control the lifecycle of another application. The API is located in the org.dvb.application package. It provides methods for an application to query a database of what other applications are signaled in the current service context. Through this database, an application can get the attributes of another application and can get a proxy (a proxy is an object which acts as a representation of another object, it acts on behalf of) to another application. Through this proxy, methods on the application which the proxy represents can be called. The methods that can be called are:

getstate( ) this returns the state that the application is in, this may consist of start, stop, paused or destroyed;

Start( ) starts the application (after pause);

Stop( ) stops the application;

Pause( ) Pauses the execution of the application.

For example, a control application, can call the Pause( ) method on the application proxy of the stored interactive application to make application B pause its execution.

Another example of how a control application can be used is when the control application is used to load another application across a digital interface. A set-top box may not be equipped with a correct file transfer protocol to load the files for an application from a storage device to the set-top box, where the application is executed. This functionality can come from another application (the control application) and loaded to the set-top box, for example through the broadcast channel. Once the control application is loaded to the set-top box it can setup a file transfer between the storage device and the set-top box for loading the files for other applications which may be stored on a removable disk or on a hard disk in the storage device.

By letting the control application take control over the stored application, the lifecycle and state issues that arise because the set-top box is not aware that the content is stored can be solved. As a result, the control application and associated video can be accessed in a random manner. In several embodiments of the invention described below, a control application is used to control the running of the stored interactive application In another embodiment of the invention, a display application is used to display the executed interactive application. It will be understood by those skilled in the art that various applications could be written to control the running of the stored interactive application and the invention is not limited to any specific application.

Figure 3:
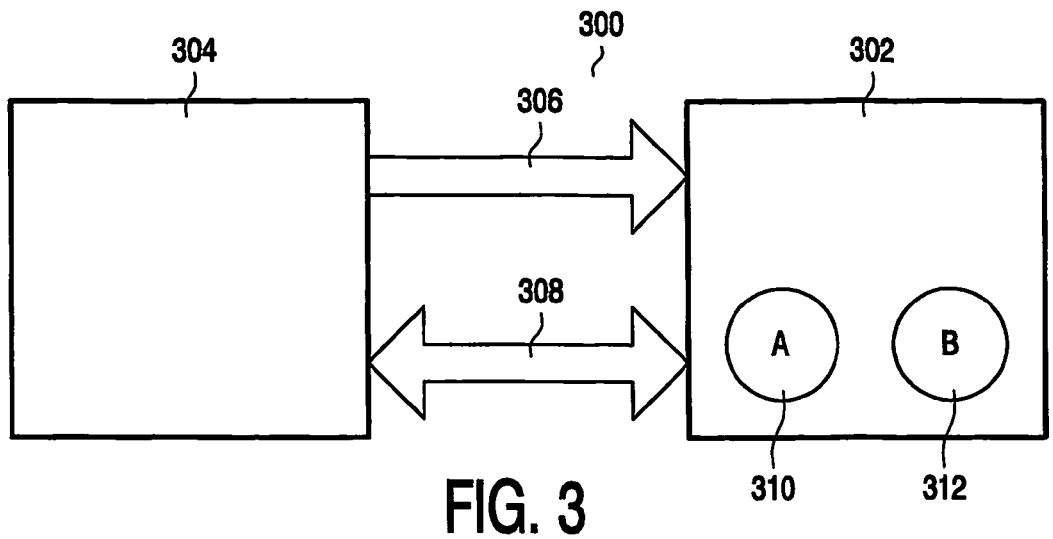
FIG. 3 illustrates a storage device/set-top box arrangement according to one embodiment of the invention.

FIG. 3 illustrates a storage medium/set-top box arrangement 300 according to one embodiment of the invention. A set-top box 302 is connected to a storage device 304 via a digital interface 306. The digital interface is used to transfer the recorded program and a control application 310 from the storage device 304 onto the set-top box 302. The set-top box 302 and the storage device 304 are also connected together by an interactive channel or interface 308. The interactive channel 308 is used to load the stored interactive application 312 onto the set-top box 302, as will be explained below with reference to FIG. 4.

Figure 4:
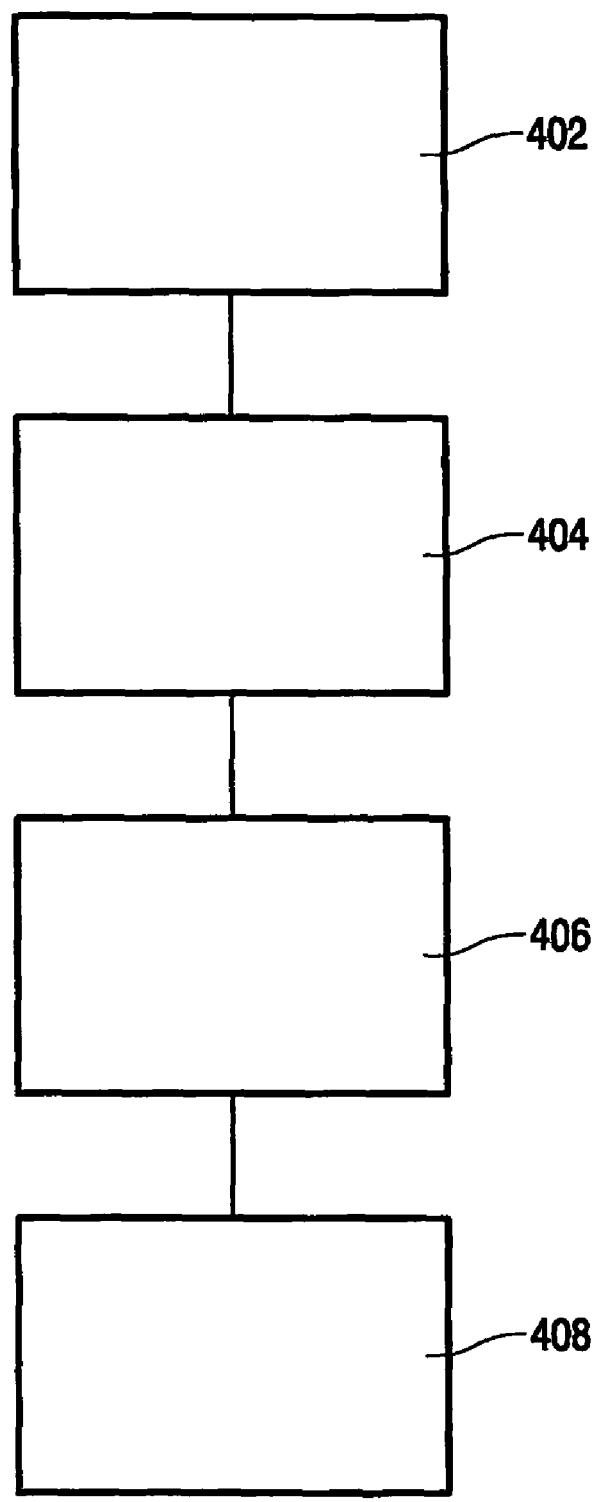
FIG. 4 is a flow chart illustrating the operation of the arrangement illustrated in FIG. 3 according to one embodiment of the invention.

FIG. 4 is a flow chart illustrating the operation of the arrangement 300. First, the program is recorded and the interactive application 312 is stored in the storage device 304 in step 402. Prior to sending the recorded program and the stored interactive application 312 to the set-top box 302, the control application, for example, an interoperable plug-in, is sent over the digital interface 306 and is loaded onto the set-top box 302 in step 404. The recorded program is then sent to the set-top box 302 over the digital interface in step 406. At the same time, the control application begins loading and controlling the stored interactive application across the interactive channel 308 for appropriate playback with the recorded program in step 408. All files and control messages needed to support proper running of the stored interactive application are sent to the control application over the interactive channel 308.

Figure 5:
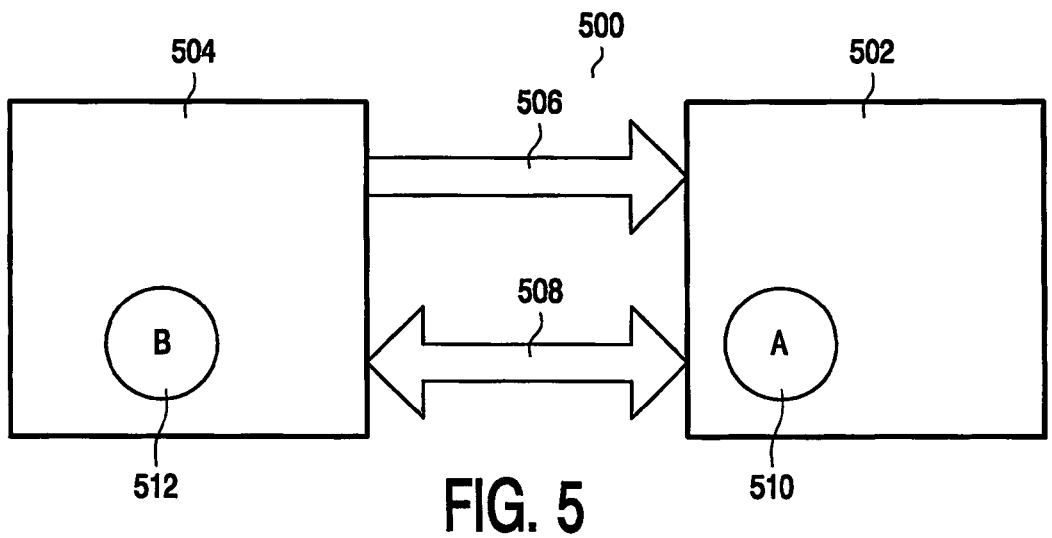
FIG. 5 illustrates a storage device/set-top box arrangement according to another embodiment of the invention.

FIG. 5 illustrates a storage medium/set-top box arrangement 500 according to one embodiment of the invention. A set-top box 502 is connected to a storage device 504 via a digital interface 506. The digital interface is used to transfer the recorded program and a display application 510 from the storage device 504 onto the set-top box 502. The set-top box 502 and the storage device 504 are also connected together by an interactive channel or interface 508. The interactive channel 508 is used to load the executed interactive application 512 onto the set-top box 502, as will be explained below with reference to FIG. 6.

Figure 6:
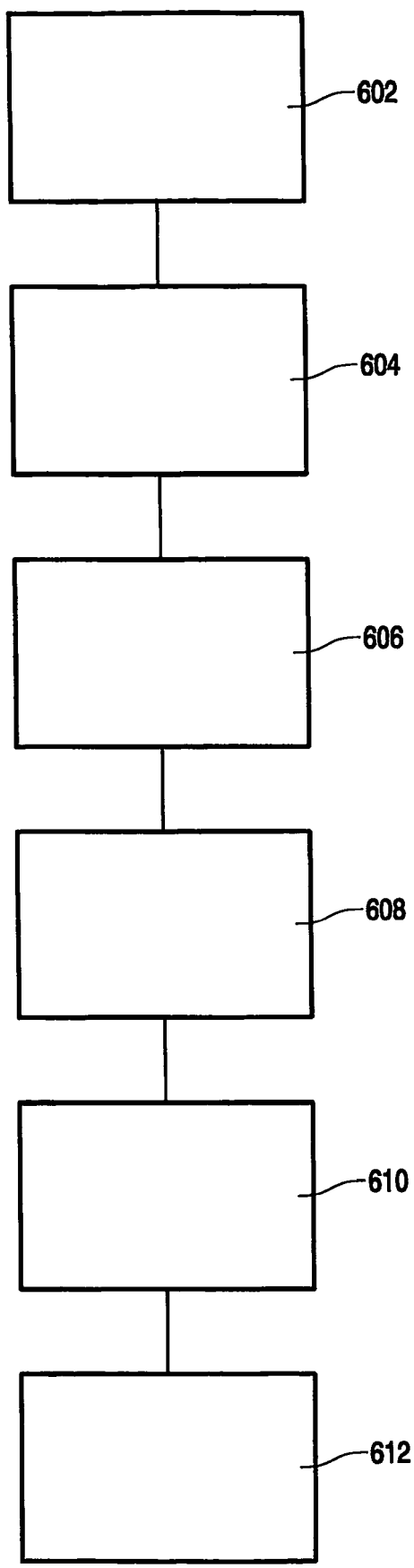
FIG. 6 is a flow chart illustrating the operation of the arrangement illustrated in FIG. 5 according to one embodiment of the invention.

FIG. 6 is a flow chart illustrating the operation of the arrangement 500. First, the program is recorded and the interactive application 512 is stored in the storage device 504 in step 602. Prior to sending the recorded program and the stored interactive application 512 to the set-top box 502, the display application 510, for example, an interoperable plug-in, is sent over the digital interface 506 and is loaded onto the set-top box 502 in step 604. The recorded program is then sent to the set-top box 502 over the digital interface in step 606. At the same time, a control device in the storage device executes the stored interactive application in step 608, and transfers the output of the executed interactive application over the interactive channel 508 to the set-top box 502 under the control of the display application 510 in step 610. The display application then displays the output appropriately with the recorded program in step 612.

Figure 7:
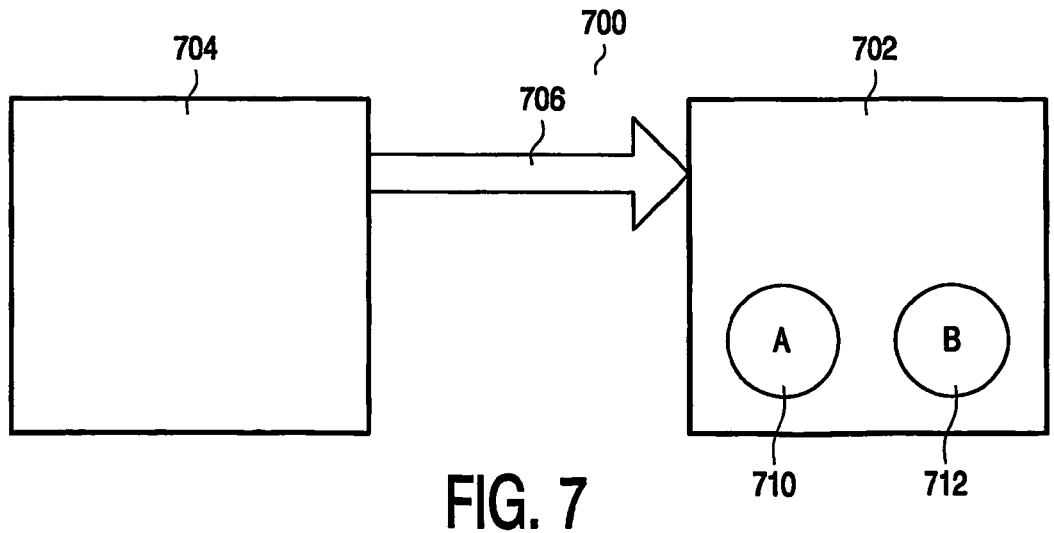
FIG. 7 illustrates a storage device/set-top box arrangement according to one embodiment of the invention.

FIG. 7 illustrates a storage medium/set-top box arrangement 700 according to one embodiment of the invention. A set-top box 702 is connected to a storage device 704 via a digital interface 706. The digital interface is used to transfer the recorded program, the stored interactive application 712 and a control application 710 from the storage device 704 onto the set-top box 702.

Figure 8:
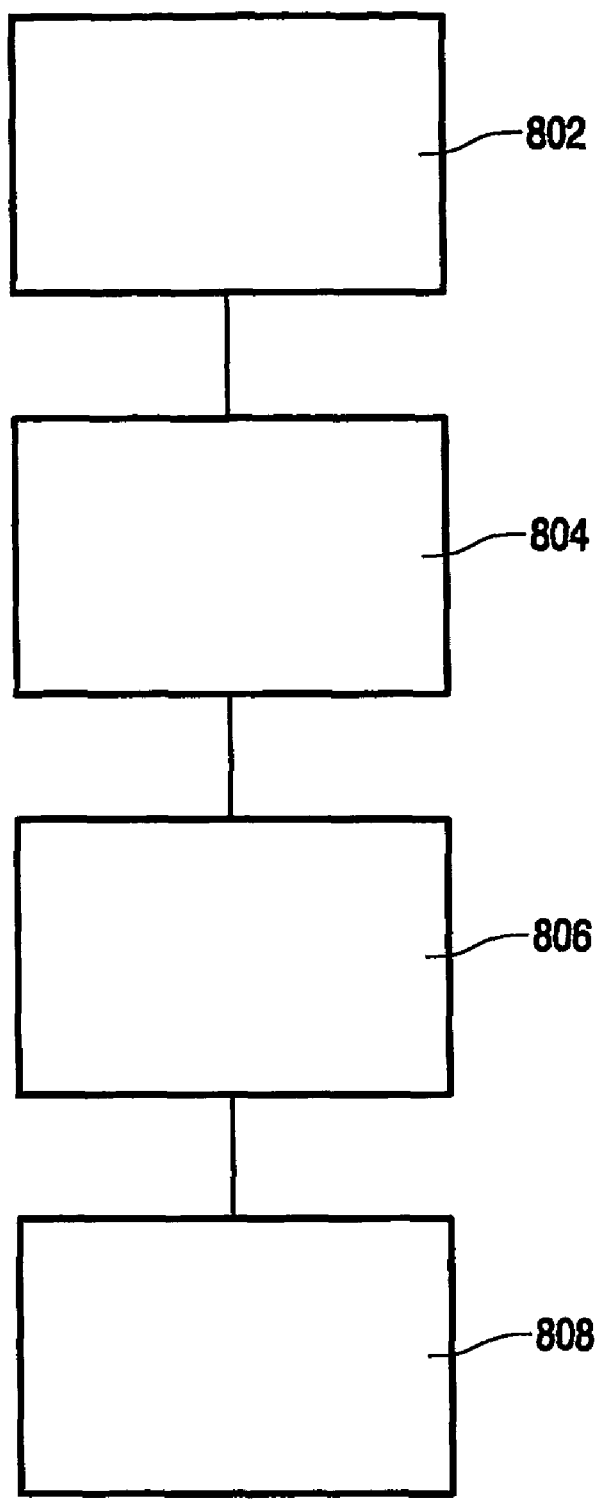
FIG. 8 is a flow chart illustrating the operation of the arrangement illustrated in FIG. 7 according to one embodiment of the invention.

FIG. 8 is a flow chart illustrating the operation of the arrangement 700. First, the program is recorded and the interactive application 712 is stored in the storage device 704 in step 802. Prior to sending the recorded program and the stored interactive application 712 to the set-top box 702, the control application 710, for example, an interoperable plug-in, is sent over the digital interface 706 and is loaded onto the set-top box 702 in step 804. The recorded program and the stored interactive application are then sent to the set-top box 702 over the digital interface 706 in step 806. The running of the stored interactive application 712 is then controlled by the control application 710 in step 808 so as to be consistent with the running of the recorded program.

It will be understood that the different embodiments of the invention are not limited to the exact order of the above-described steps as the timing of some steps can be interchanged without affecting the overall operation of the invention. Furthermore, the term "comprising" does not exclude other elements or steps, the terms "a" and "an" do not exclude a plurality and a single processor or other unit may fulfill the functions of several of the units or circuits recited in the claims.

The invention claimed is:

1. A method for improving the performance of playback of a stored interactive application on a decoding apparatus, said stored interactive application having been previously stored locally in a storage device associated with said decoding apparatus for subsequent playback, said method comprising the steps of:
    playing back a recorded stream of audio-visual data associated with the stored interactive application, said stream of audio-visual data having also been previously stored in said storage device; and
    controlling running of the stored interactive application using a second application,
    wherein the second application is a control application,
    wherein the second application is also stored in the storage device,
    and wherein said method further comprises the step of:
    prior to beginning running of the stored interactive application, transferring the second application to the decoding apparatus.

2. The method according to claim 1, wherein said method further comprises the step of:
    transferring all files and control messages needed to support the running of the interactive application from the storage device to the decoding apparatus.

3. The method according to claim 1, wherein the second application is an interoperable plug-in application.

4. The method according to claim 1, wherein the second application is stored in the decoding apparatus.

5. The method according to claim 1, wherein the second application is a display application.

6. The method according to claim 5, wherein the display application is stored in the decoding apparatus.

7. The method according to claim 6, wherein said method further comprises the steps of:
    executing the stored interactive application in the storage device; and
    transferring the output of the executed interactive application to the display application for display.

8. An apparatus for improving the performance of playback of a stored interactive application, comprising:
    a storage device having stored therein a recorded program and an interactive application, the interactive application being association with the recorded program;
    a decoding apparatus for running the recorded program and the interactive application;
    a first interface between the storage device and the decoding apparatus for transferring the recorded program and the interactive application from the storage device to the decoding apparatus; and
    a second application for controlling the operation of running of the stored interactive application,
    wherein the second application is a control application,
    and wherein the second application is stored in the storage device and is loaded onto the decoding apparatus before running of the interactive application begins.

9. The apparatus according to claim 8, wherein said apparatus further comprises:
    a second interface for providing the interactive application and control messages to the second application which are needed to support the playback of the interactive application.

10. The apparatus according to claim 8, wherein the second application is an interoperable plug-in application.

11. The apparatus according to claim 8, wherein the second application is stored in the decoding apparatus.

12. The apparatus according to claim 8, wherein the second application is a display application.

13. The apparatus according to claim 12, wherein the display application is stored in the decoding apparatus.

14. The apparatus according to claim 13, wherein said apparatus further comprises:
    means for executing the stored interactive application in the storage device; and
    a second interface for transferring the output of the executed interactive application to the display application for display.

* * * * *